M. M. SHERWOOD.
FIFTH WHEEL FOR VEHICLES.
APPLICATION FILED APR. 10, 1909.
953,717.
Patented Apr. 5, 1910.
3 SHEETS—SHEET 3.
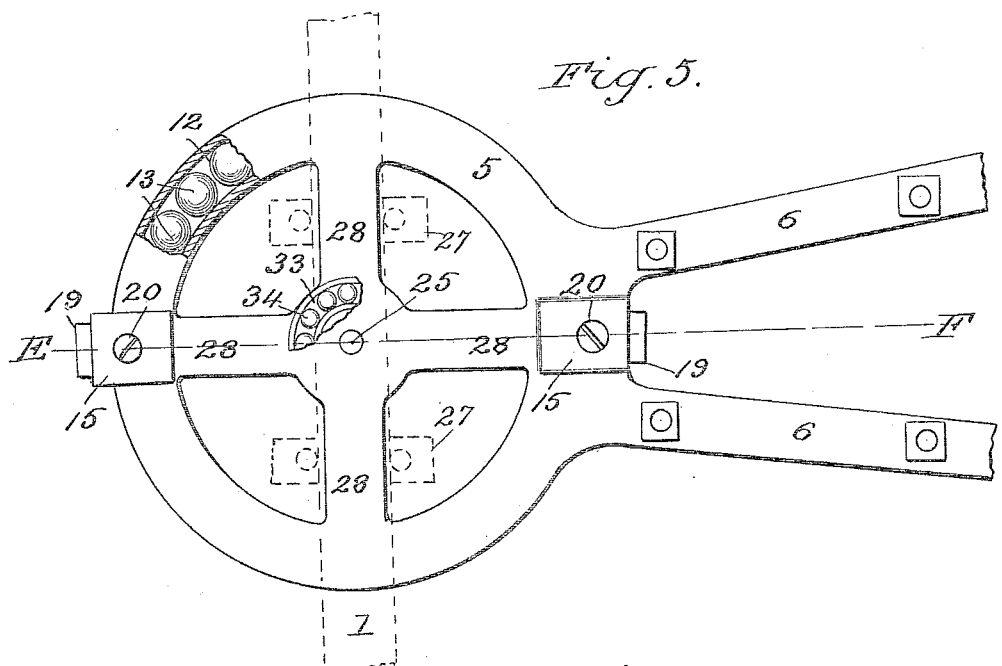
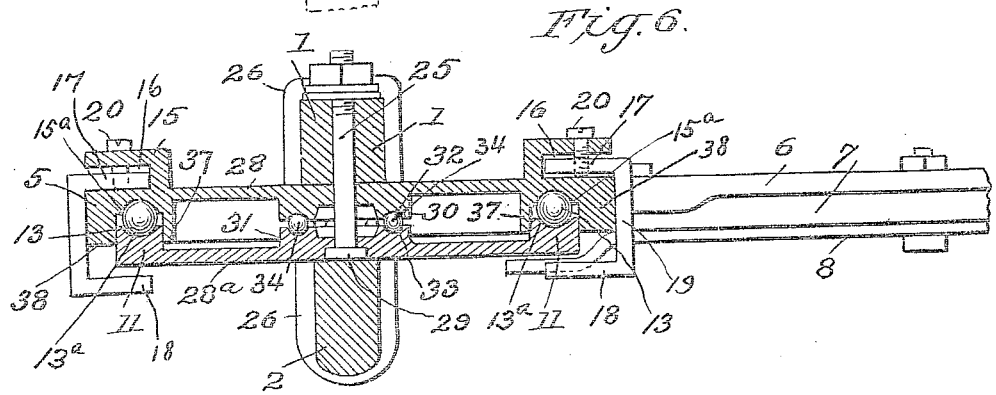
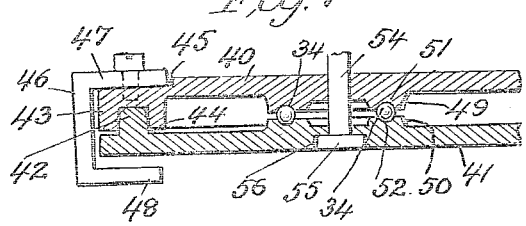

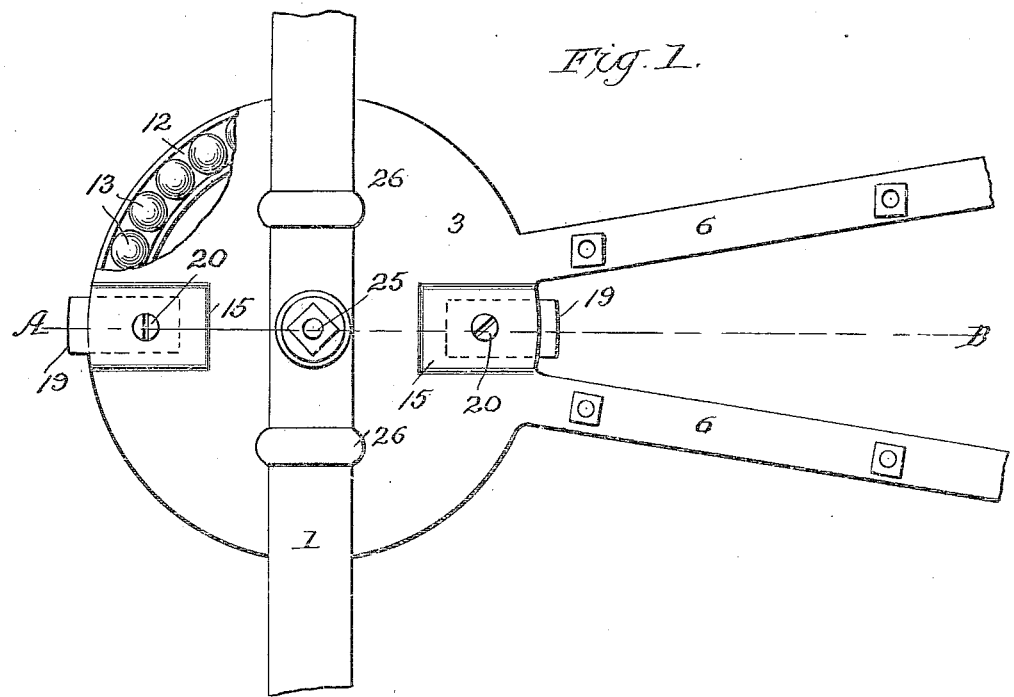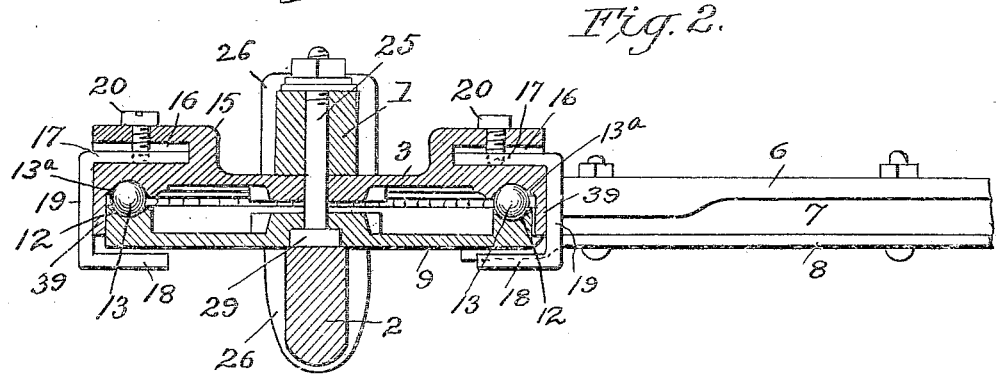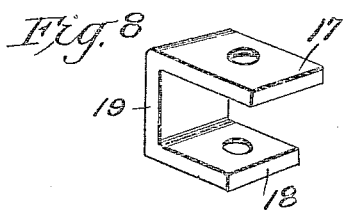

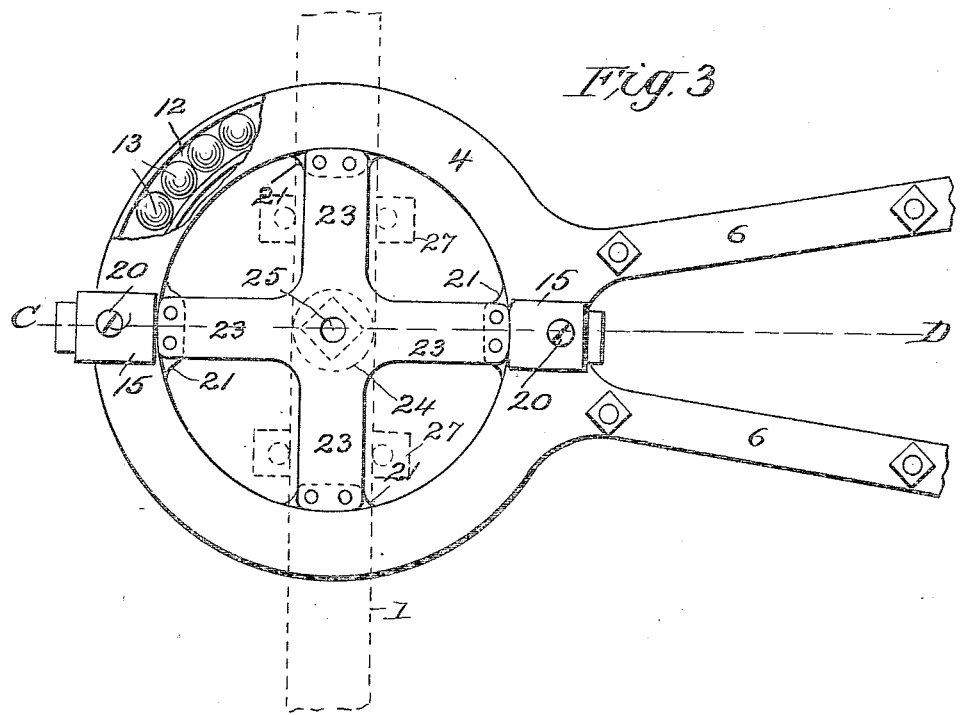
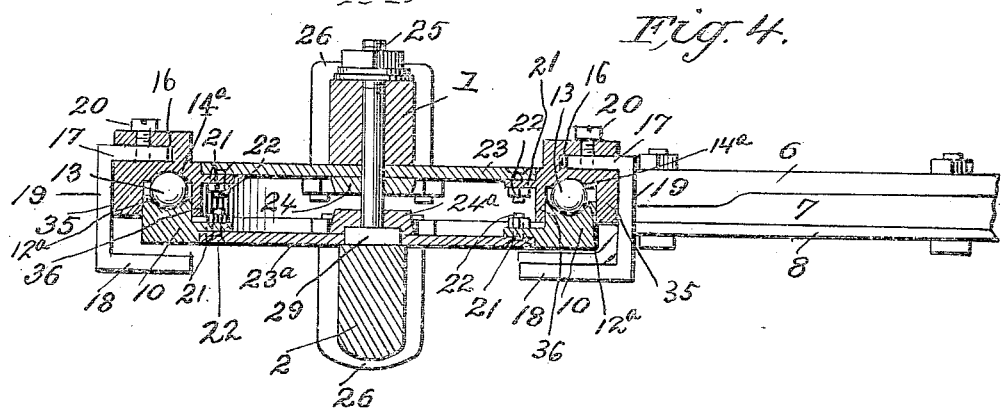

UNITED STATES PATENT OFFICE.

MATTHEW M. SHERWOOD, OF SCRANTON, PENNSYLVANIA.

FIFTH-WHEEL FOR VEHICLES.

953,717.  Specification of Letters Patent.  Patented Apr. 5, 1910.

Application filed April 10, 1909. Serial No. 439,146.

*To all whom it may concern:*

Be it known that I, MATTHEW M. SHERWOOD, a citizen of the United States, residing at Scranton, in the county of Lackawanna and State of Pennsylvania, have invented certain new and useful Improvements in Fifth-Wheels for Vehicles; and I do hereby declare the following to be a full, clear, and exact description of the invention, such as will enable others skilled in the art to which it appertains to make and use the same.

This invention relates to fifth wheels for vehicles, and has for an object to provide a compact and easily mounted fifth wheel intended to be applicable to all classes of vehicles.

With this and other objects in view the invention comprises certain novel constructions, combinations and arrangement of parts as will be hereinafter more fully described and claimed.

In the accompanying drawings: Figure 1 represents a top plan view of the preferred form of my invention. Fig. 2 represents a section in elevation on line A—B of Fig. 1. Fig. 3 represents a top plan view of a slightly modified form of the invention. Fig. 4 represents a section in elevation on line C—D of Fig. 3. Fig. 5 represents a top plan view of another modification of the invention. Fig. 6 represents a sectional elevation on line E—F of Fig. 5. Fig. 7 represents a sectional elevation of another and slightly modified form of the invention. Fig. 8 represents a detail perspective view of a substantially U-shaped bracket as shown in application on the several views.

Referring to the drawings 1 designates a bolster rigidly mounted on the top bearing plates 3, 4 and 5. Upon axle 2 is rigidly mounted the bottom bearing plates 9, 10 and 11. Projecting from the bearing plates 3, 4 and 5 are extensions 6 to which are secured portions of a running gear, as 7 and 8. The bottom bearing plates 9, 10 and 11 are provided with annular grooves 12, 12$^a$ and 13$^a$, and the top bearing plates 3, 4 and 5 are provided with annular grooves 13$^a$, 14$^a$ and 15$^a$. Within the annular grooves 12, 12$^a$ and 13$^a$, and 13$^a$, 14$^a$ and 15$^a$ are positioned anti-friction balls 13 which act to form a ball-bearing joint between the top bearing plates 3, 4 and 5 and the bottom bearing plates 9, 10 and 11. Upon the top bearing plates 3, 4 and 5 are formed projections 15 within which is formed a cavity 16. Within the cavity 16 is projected one arm 17 of a substantially U-shaped bracket 19. The U-shaped bracket 19 is also provided with an arm 18 which is substantially parallel with the arm 17 and which projects under the bearing plates 9, 10 and 11. The U-shaped bracket 19 is held in position by a set-screw 20 passing through the projection 15 on the top bearing plates 3, 4 and 5, and the set-screw 20 is brought into engagement with the arm 17 of the bracket 19. The purpose of the U-shaped bracket 19 is to prevent the top bearing plates 3, 4 and 5 from tilting on the anti-friction balls 13, and also to hold the top and bottom bearing plates in their proper position, as for instance, when the vehicle is thrown up higher on one side than on the other the tendency would be to raise the top bearing plates 3, 4 and 5 off of the anti-friction balls 13 at one side and cause an excessive strain to be thrown on the anti-friction balls on the opposite side. The U-shaped bracket 19 also serves to prevent the body portion of the vehicle from becoming dislodged and separating from the running gear.

In Figs. 3 and 4 the top and bottom bearing plates 4 and 10 are made in the form of annular rings with the central portions left open. The top and bottom bearing plates 4 and 10 are provided with inwardly projecting lugs 21. To the lugs 21 are secured, by means of bolts 22, projecting arms 23 and 23$^a$ and extending from the central boss 24 and 24$^a$ through which passes a king bolt 25 upon which the bolster 1 is pivotally mounted. The purpose of the arms 23 and 23$^a$ is to provide means for securing the bolster 1 and the axle 2, and this is done by means of passing U-shaped bolts 26 over the bolster 1 and the axle 2 and securing the same to plates 27 located on the arms 23 and 23$^a$.

In Figs. 5 and 6 the arms 28 and 28$^a$ are made integral with the top and bottom bearing plates 5 and 11, and the bolster 1 and the axle 2 are secured to the arms 28 and 28$^a$ in the same way as in Figs. 3 and 4 by means of the bolts 26 and plates 27. In Figs. 1 and 2 the bolster 1 and axle 2 are secured by the U-shaped bolts 26 which connect up direct with the bearing plates 3 and 9 and without the use of the plates 27.

In Figs. 2 and 6 the king bolt 25 has a squared head 29 seated in the rectangular cavity located in the center of the bearing plates 9 and 11 respectively, and the king bolt 25 is held therein against rotation.

In Fig. 4 the squared head 29 of the king bolt 25 is seated in the rectangular cavity located in the center boss portion of the arm 23ª, and is held therein against rotation.

In Figs. 5 and 6 arms 28 and 28ª of the bearing plates 5 and 11 are formed integral with boss like projections 30 and 31 respectively which are provided with annular grooves 32 and 33 in which are positioned anti-friction balls 34.

In Fig 4 the top bearing plate 4 is provided with downwardly projecting annular flanges 35 and 36 between which the upstanding portion of the bearing plate 10 projects, and by which the latter is guided and held against lateral movement.

In Fig. 6 the top bearing plate 5 is provided with downwardly projecting annular flanges 37 and 38 between which the upstanding portion of the bottom bearing plate 11 projects and by which the latter is guided and held against lateral movement.

In Fig. 2 the top bearing plate 3 is provided with a downwardly projecting annular flange 39 which engages the outer surface of the upstanding annular groove portion of the bottom bearing plate 9. The purpose of the annular flange 39 is to assist in holding the bearing plate 3 against lateral movement.

Fig. 7 consists of the top bearing plate 40 and the bottom bearing plate 41. The bottom bearing plate 41 is provided with an upstanding annular projection 42 which forms a bearing for the top plate 40. The top plate 40 is provided with downwardly projecting annular flanges 43 and 44 which engage the upstanding projection 42 on its inner and outer periphery. The downwardly projecting annular flanges 43 and 44 hold the bearing plate 40 against lateral movement.

Within the top surface of the edge of the bearing plate 40 is provided a recess 45 into which is seated an arm 47 of the U-shaped bracket 46. The U-shaped bracket 46 is also provided with an arm 48 which passes under the bearing plate 41. The purpose of the U-shaped bracket 46 is to hold the bearing plates 40 and 41 in proper vertical relation with each other. The bearing plates 40 and 41 are provided at their centers with annular boss like projections 49 and 50 respectively in which are formed grooves 51 and 52, and within the grooves 51 and 52 are positioned anti-friction balls 34. The bearing plate 41 is intended to rotate upon the anti-friction balls 34 which move within the grooves 51 and 52. The king bolt 54 is provided with a squared head 55 which fits into the squared recess 56 in the center of the bearing plate 41. The purpose of the squared head 55 is to hold the king bolt rigid with the bearing plate 41, the bearing plate 40 being pivotally connected with the king bolt 54.

In the operation of my device the annular grooves in the top bearing plates 3, 4, 5 and 40 serve as paths for the anti-friction balls 13 and 34 upon which the bearing plates 9, 10, 11 and 41 rotate. The bearing plates 9, 10, 11 and 41 are also provided with grooves which support the anti-friction balls 13 and 34 from below. In all cases the top and bottom bearing plates are held together at the center by the king bolt 25 made rigid with the bottom bearing plates. The king bolt projects through the top bearing plates and is pivotally connected with the same as well as with the bolster 1 to which the front end of the vehicle is connected. Bearing plates 3, 4 and 5 are provided with extensions 6 to which are connected the parts of the running gear 7 and 8 which connect with the rear axle of the vehicle. The front axle is rigidly connected with the bottom bearing plates 9, 10 and 11 and when the axle 2 is made to turn with the king bolt 25 the bottom bearing plates also turn and rotate upon the anti-friction balls 13 and 34.

What I claim is:—

In a fifth wheel for vehicles the combination of a top bearing plate formed substantially ring-shaped in construction, with a bottom bearing plate provided with upstanding projections, and having a groove formed therein, a depending projection carried by the top bearing plate and having a groove formed therein, anti-friction balls positioned in the grooves, an upstanding member carried by the top bearing plate, a recess formed between the upstanding member and the top bearing plate, a securing member formed with two projecting arms, one of the arms projecting into the recess formed between the upstanding member and the top bearing plate, the other arm projecting beneath the bottom bearing plate, a plurality of inwardly projecting lugs carried by the ring beneath the upper surface thereof, a bolster securing member having a central boss-like portion with a plurality of arms projecting therefrom and adapted to engage the inwardly extending projections carried by the ring, substantially as shown and described.

In testimony whereof I affix my signature in presence of two witnesses.

MATTHEW M. SHERWOOD.

Witnesses:
J. W. HOPEWELL,
JOHN F. SALTRY.